Figure 14:
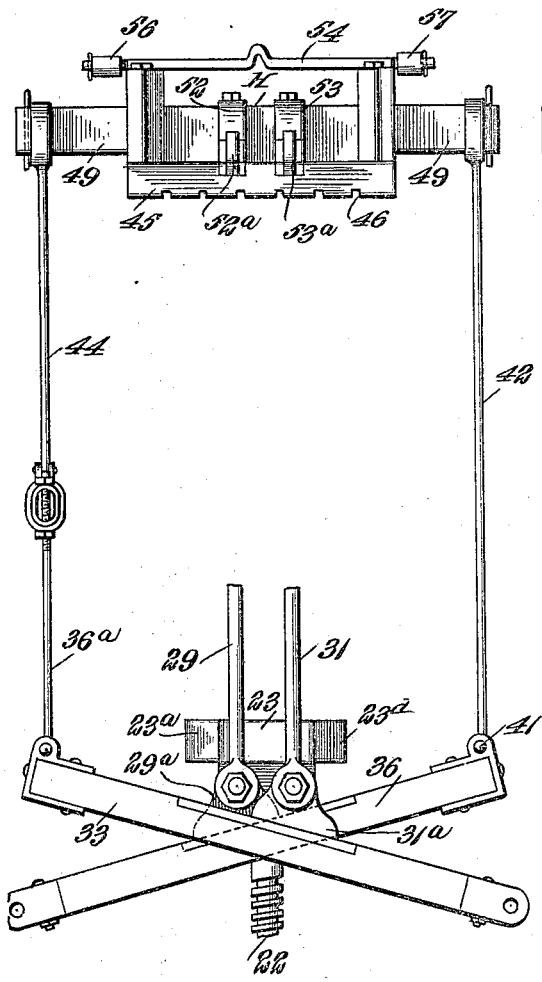

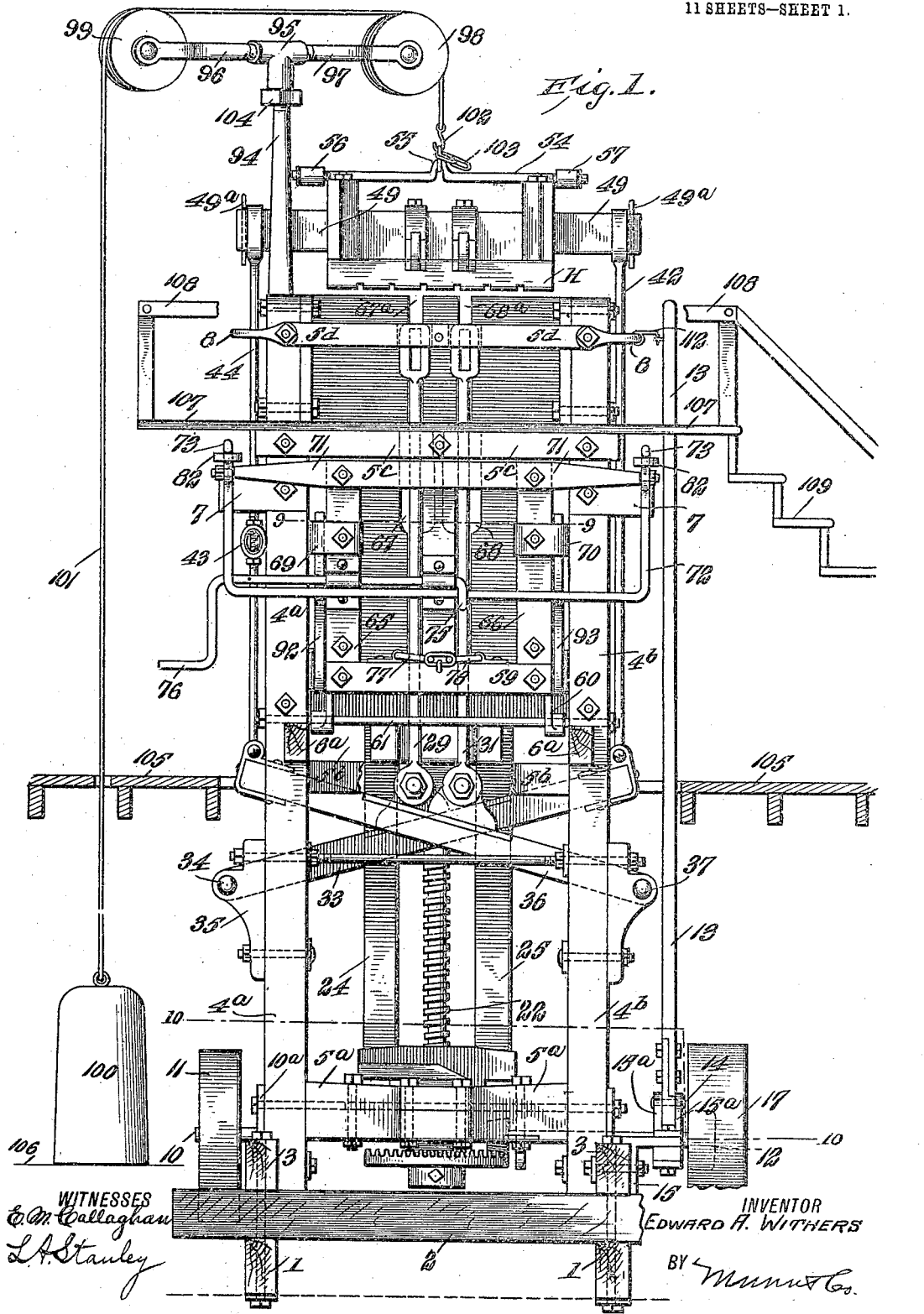

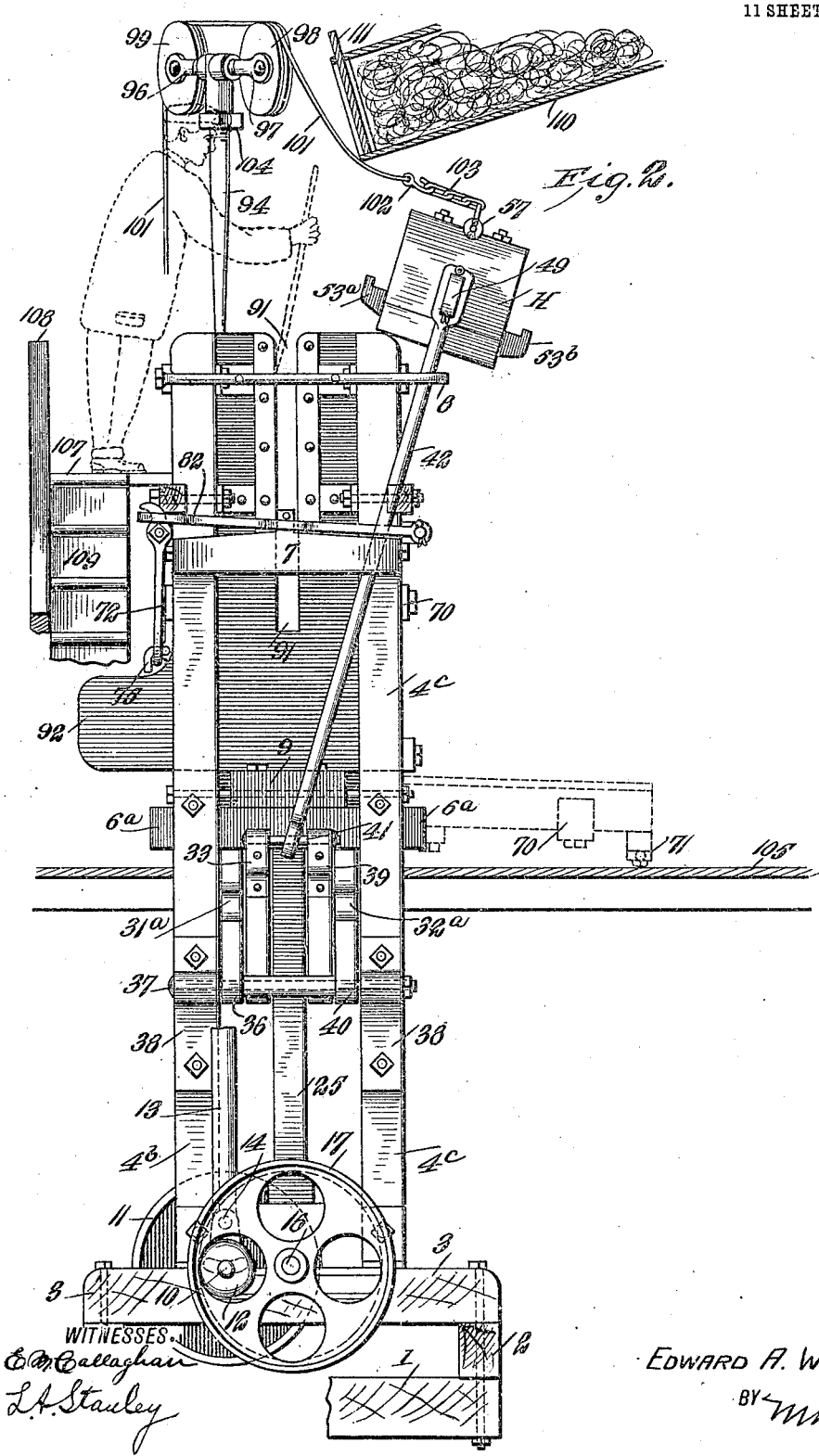

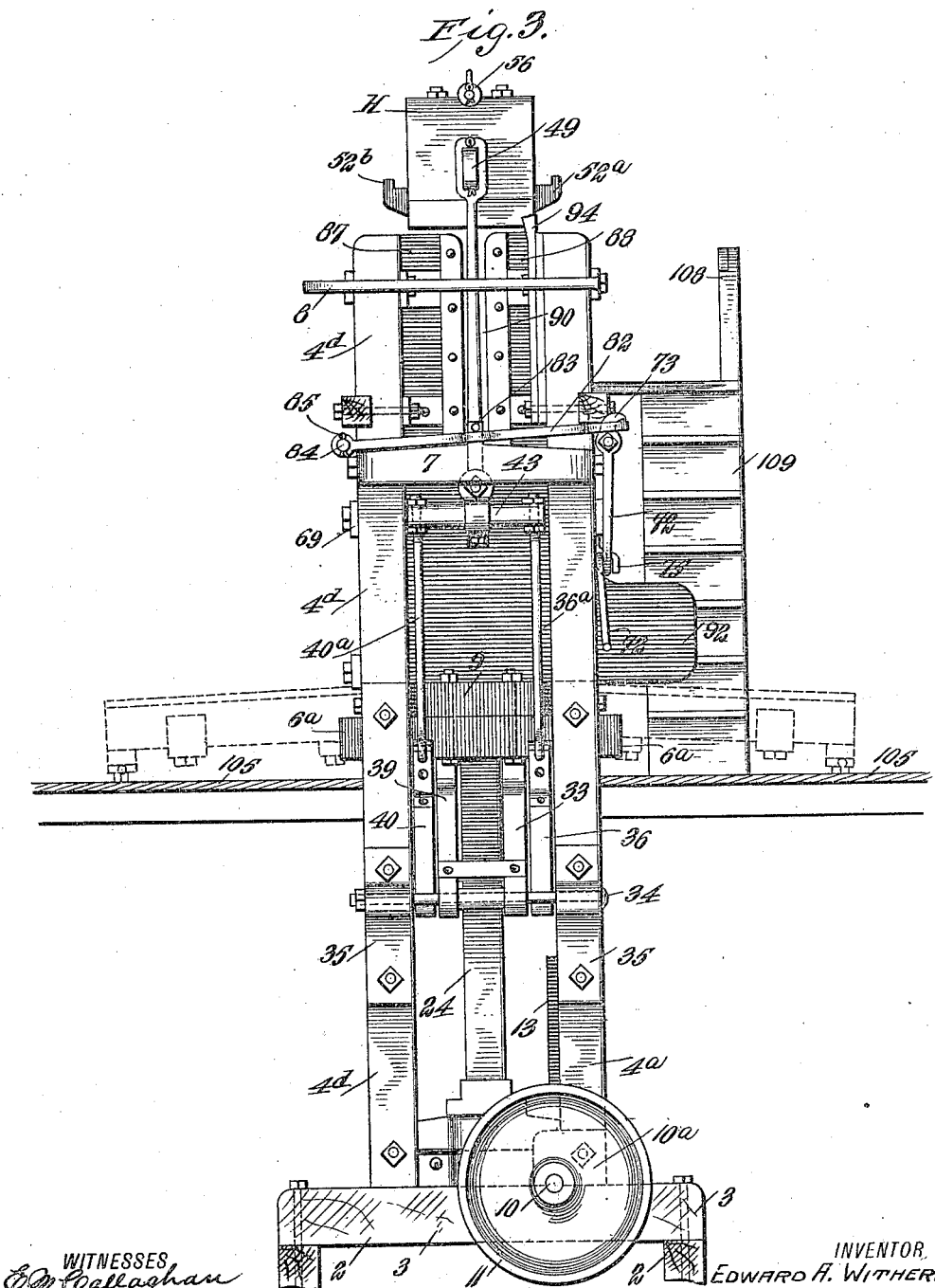

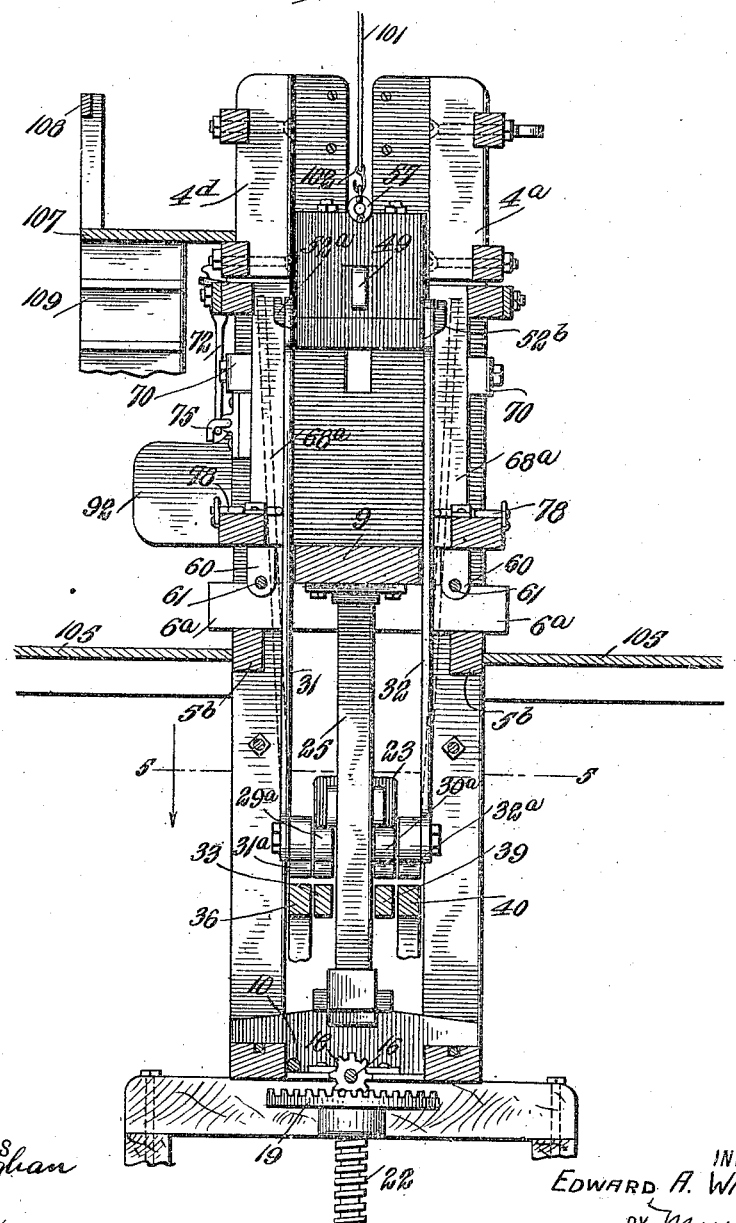

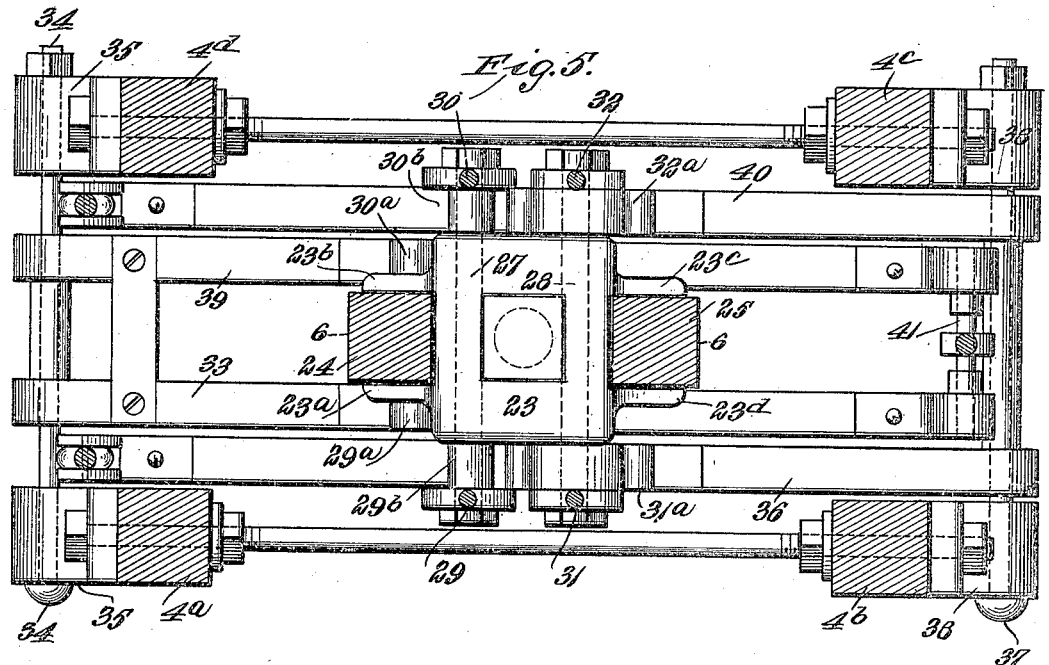

E. A. WITHERS.
COTTON BALING PRESS.
APPLICATION FILED SEPT. 21, 1909.
952,291.
Patented Mar. 15, 1910.
11 SHEETS—SHEET 6.
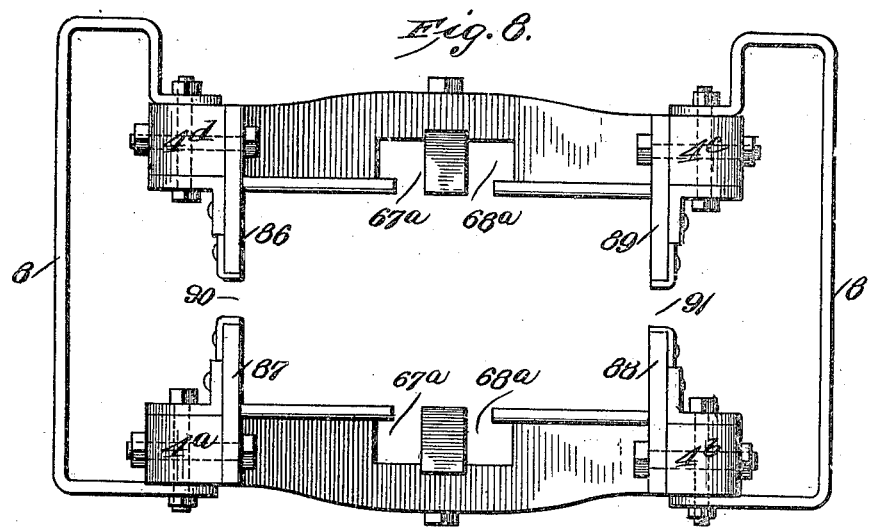
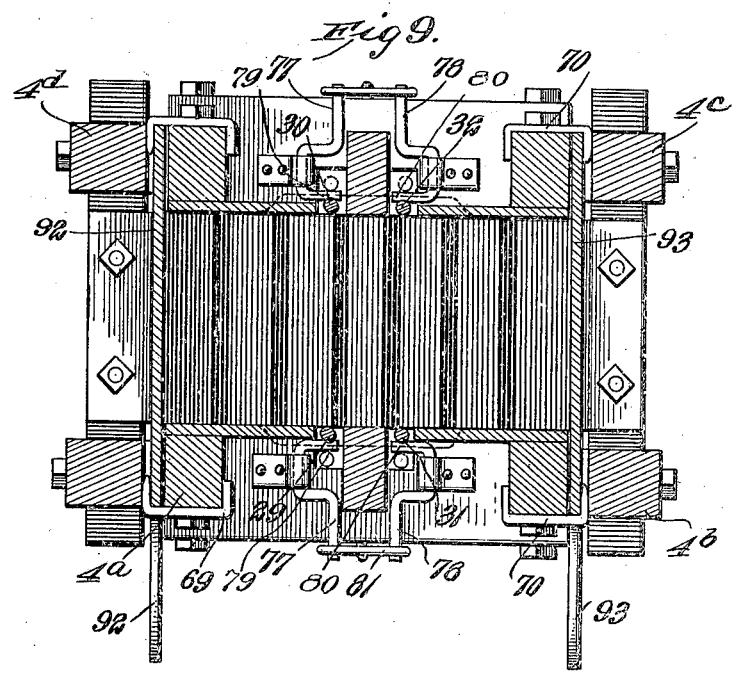
WITNESSES
E. M. Callaghan
L. A. Stanley
INVENTOR
EDWARD A. WITHERS
BY Munn & Co.
ATTORNEYS

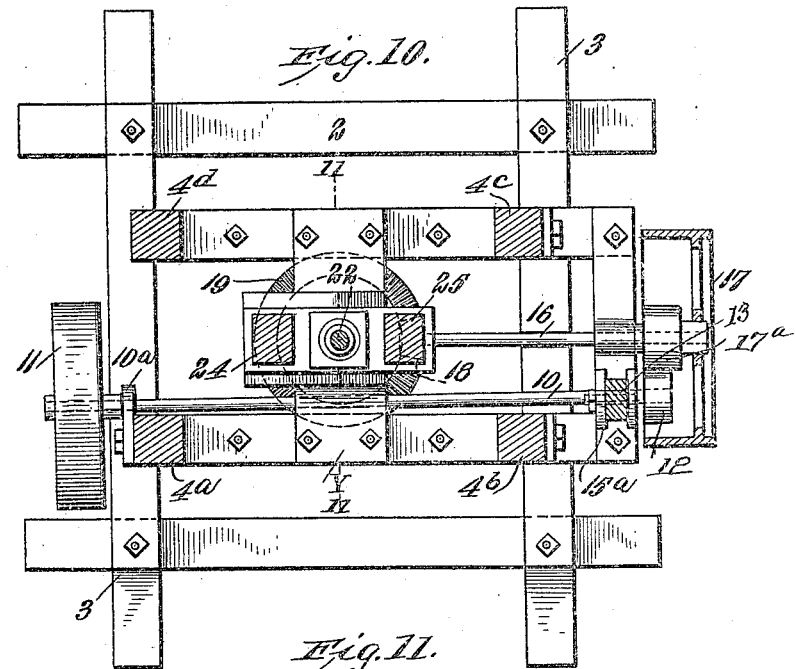

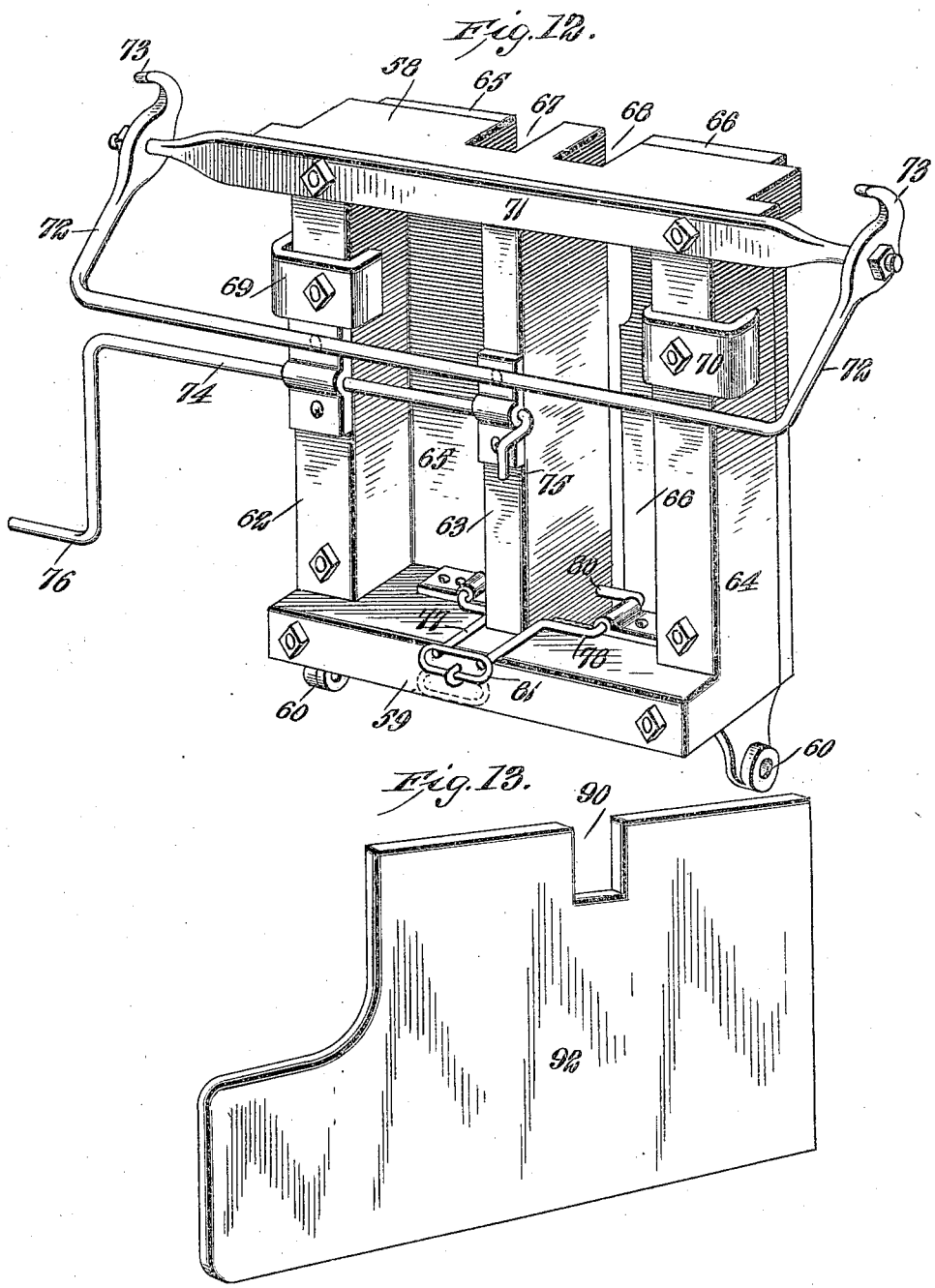

E. A. WITHERS.
COTTON BALING PRESS.
APPLICATION FILED SEPT. 21, 1909.

952,291.

Patented Mar. 15, 1910.
11 SHEETS—SHEET 9.

WITNESSES
E. M. Callaghan
L. A. Stanley

INVENTOR
EDWARD A. WITHERS
BY Munn & Co.
ATTORNEYS

E. A. WITHERS.
COTTON BALING PRESS.
APPLICATION FILED SEPT. 21, 1909.

952,291.

Patented Mar. 15, 1910.
11 SHEETS—SHEET 10.

WITNESSES
E. M. Callaghan
L. A. Stanley

INVENTOR
EDWARD A. WITHERS

BY
ATTORNEYS

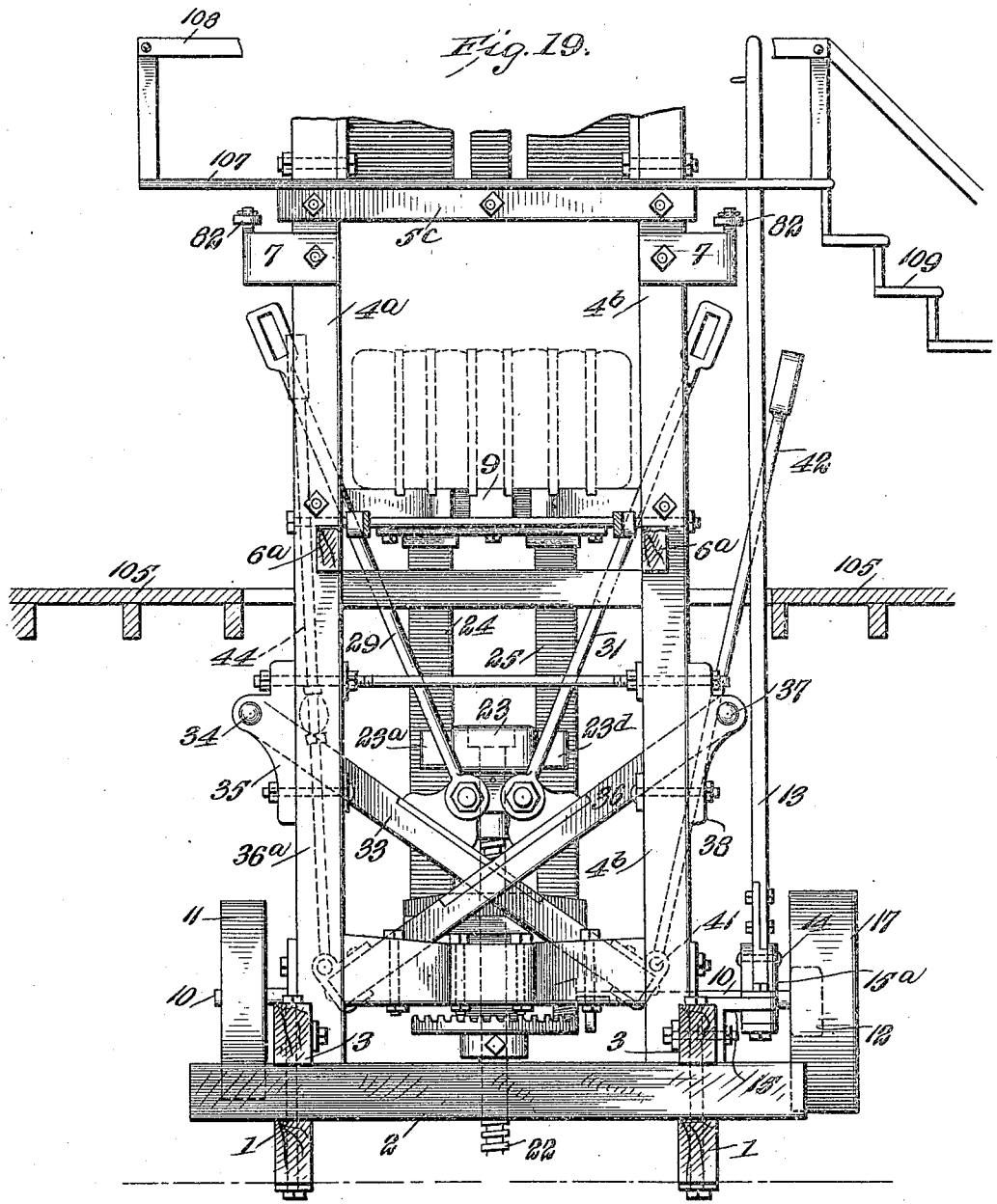

UNITED STATES PATENT OFFICE.

EDWARD A. WITHERS, OF ATLANTA, GEORGIA.

COTTON-BALING PRESS.

952,291.  Specification of Letters Patent.  Patented Mar. 15, 1910.

Application filed September 21, 1909. Serial No. 518,811.

*To all whom it may concern:*

Be it known that I, EDWARD A. WITHERS, a citizen of the United States, and a resident of Atlanta, in the county of Fulton and State of Georgia, have invented certain new and useful Improvements in Cotton-Baling Presses, of which the following is a specification.

My invention relates to improvements in means for pressing and baling cotton, and it consists in the combinations, constructions and arrangements of parts herein described and claimed.

An object of my invention is to provide a device which will press and bale a large amount of cotton in a comparatively short time, by the use of a device of relatively simple construction.

A further object of my invention is to provide a cotton tamper driven by a slow acting power screw, in which the movement of the head is increased, thereby decreasing the time taken in pressing the successive charges, with means for changing the attachment of the head so that the movement of the power screw may be communicated directly to the latter, thereby increasing the power for baling purposes.

A further object of my invention is to provide a pressing and baling device in which the power used is one of tension and not of compression, thereby insuring an equal distribution of the stress, in the various parts.

A further object of my invention is to provide a device in which the cotton, after being baled, may be immediately removed from the position in which it is finally compressed, thus obviating the necessity of forcing the bale backwardly out of the restricted box, and thereby injuring the fiber.

Other objects and advantages will appear in the following specification, and the novel features will be particularly pointed out in the appended claims.

My invention is illustrated in the accompanying drawings, forming a part of this application, in which similar reference characters indicate like parts in the several views, and in which—

Figure 15:
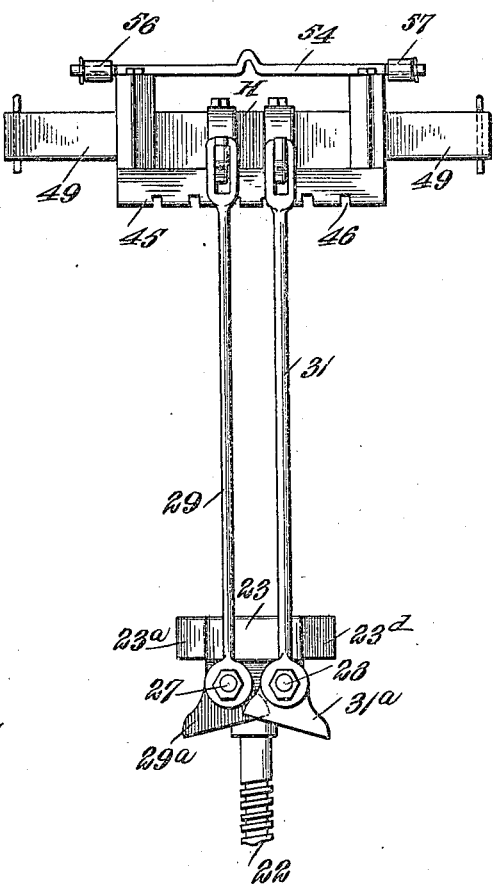
Figure 16:
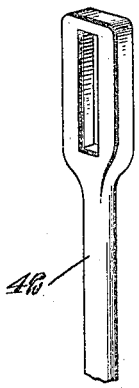
Figure 17:
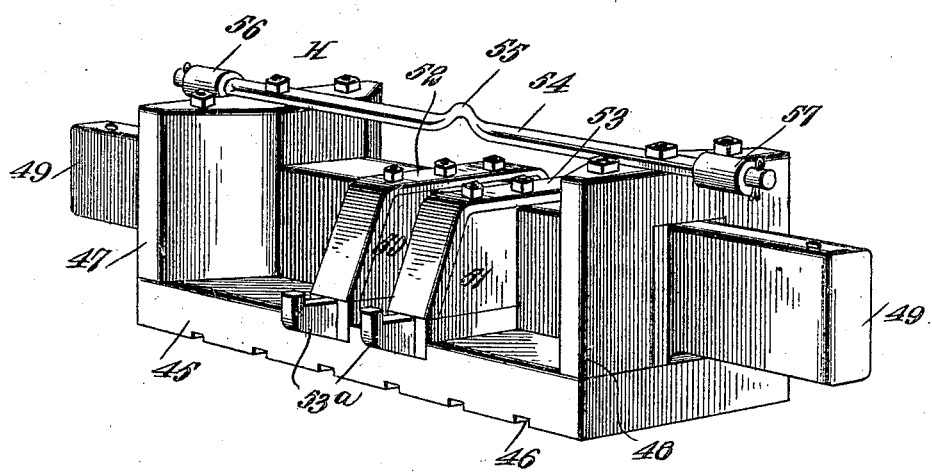
Figure 18:
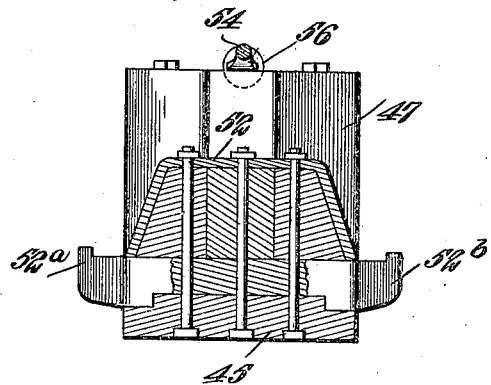

Figure 1 is a side view, showing one embodiment of my invention, Fig. 2 is an end view, Fig. 3 is a view of the end opposite that shown in Fig. 2, Fig. 4 is a central vertical section through the device at right angles to Fig. 1, Fig. 5 is an enlarged detail section along the line 5—5 of Fig. 4, Fig. 6 is a section along the line 6—6 of Fig. 5, Fig. 7 is a side view of the part shown in Fig. 6, Fig. 8 is a plan view of the top part of the box, Fig. 9 is a section along the line 9—9 of Fig. 1, the locking mechanism being removed for the sake of clearness, Fig. 10, is a section along the line 10—10 of Fig. 1, Fig. 11 is an enlarged section through the driving gear and nut, Fig. 12, is a perspective view of one of the doors, Fig. 13 is a perspective view of one of the removable sides, Fig. 14 is a detail view showing the connection of the head with the power devices, Fig. 15 is a similar view showing the tension rods, secured to the hooks of the head, Fig. 16 is a perspective view of one of the tension rods, Fig. 17 is a perspective view of the head, Fig. 18 is a transverse section through the head, Fig. 19 is a side view showing the position of the parts when a bale is about to be taken out of the box.

In carrying out my invention I provide a suitable framework comprising the base members 1, the cross pieces 2 and 3, and the four uprights 4$^a$, 4$^b$, 4$^c$ and 4$^d$, respectively. The latter constitute the four corners of the self-contained tamper and baler. They are connected together by means of suitable cross pieces 5$^a$, 5$^b$ 5$^c$ and 5$^d$, on both sides, and 6$^a$, 7 and 8 on the ends. The two latter members are U-shaped as shown in Figs. 8 and 19, and serve also as retaining members for the tension levers, as will be explained later. Supported on the cross members 6$^a$ is a base member 9, which forms the bottom of the box. This member is grooved to provide slots for the top of the ties.

Journaled at the bottom of the frame is the power shaft 10 which bears on one end a drive pulley 11, and on the other end a small friction wheel 12. The bearing 10$^a$ for the shaft 10 at the end near the drive pulley 11 is stationary, (as seen in Fig. 3), but the bearing for the opposite end of the shaft is in the lower part of an upright lever 13 which is pivoted at 14 between the arms 15$^a$ of a Z-shaped support 15 carried by the cross member 3, (as is clearly shown in Figs. 10, 1 and 19). It will thus be seen that by the movement of the upper end of the lever, the end of the shaft bearing the friction wheel 12 may be shifted slightly.

Referring now particularly to Fig. 10, it will be seen that the drive shaft 16 is journaled in the member 15 and is provided on its outer end with integral friction pulleys 17 and 17ᵃ and on its inner end with a bevel gear 18. The friction wheel 12 is disposed between the pulleys 17 and 17ᵃ and is adapted to be brought into contact with either one when the lever 13 is shifted, whereby the power transmitted through the power shaft 10 is communicated to the drive shaft 16. The gear 18 meshes with the larger gear 19 disposed centrally of the device and secured by means of the set screw 20 to a nut 21 which is provided with a key 21ᵃ, upon which the set screw bears, and which is threaded internally to receive the power screw 22, (see Fig. 11). The nut 21 is threaded at its upper end 21ᵇ and is provided with the shoulders 21ᶜ and 21ᵈ. The first named shoulder is arranged to bear upon the shoulder $y$ of the yoke Y, a washer $y'$ being disposed between these two parts. The bearing cones $y^2$ are disposed between the shoulder 21ᵈ on the nut and the shoulder $y^3$ on the yoke Y. The yoke Y is securely bolted to the cross members of the main frame. A bearing collar 21ᵉ is secured to the threaded portion 21ᵇ of the nut, which prevents the downward movement of the latter, and which, consequently, holds the gear 19 in position. The gear 19 is provided with the two dowel pins 12ᶠ, which fit into registering depressions in the under side of the nut, as clearly shown in the figure.

The upper end of the power screw 22 is secured in the end of a cross head 23, (see Figs. 5, 6, and 7.) This cross head is provided with arms 23ᵃ, 23ᵇ, 23ᶜ, and 23ᵈ which straddle the guide posts 24 and 25 on either side. These posts 24 and 25, besides guiding the cross-head 23, serve as additional supporting members for the bottom 9 of the box. Near the upper end of the power screw 22 is a pin 26, (see Fig. 6) which passes through the head and prevents the latter from movement on the screw rod.

Arranged to pass through suitable openings in the cross head, are pins 27 and 28. At the ends of pins 27 are attached the tension rods 29 and 30, (see Fig. 4), while to the ends of the pin 28 are secured the tension rods 31 and 32, respectively, (see Fig. 5). Between the enlarged lower end of the rod 29 and the body 23 of the cross head, there is pivotally secured a shoe 29ᵃ this shoe being spaced from the end of the rod by means of a collar or sleeve 29ᵇ. The rod 30 opposite is provided with a similar shoe 30ᵃ which is spaced from the end of the rod by means of a similar sleeve 30ᵇ. A rod 31 is provided with a pivoted shoe 31ᵃ which is spaced from the cross head by a sleeve similar to the sleeve 29ᵃ. Adjacent to the rod 32 is a pivoted shoe 32ᵃ which is also spaced from the cross head. The disposition of the shoes with respect to the rods is clearly shown in Figs. 5, 14, and 15.

Referring now particularly to Figs. 1 and 19, it will be seen that there is a lever 33 which is pivotally mounted on a rod 34 carried by the brackets 35 secured to the uprights 4ᵃ and 4ᵈ. Outside of this lever there is another lever 36 which is pivotally mounted on a rod 37 carried by the brackets 38 secured to the uprights 4ᵇ and 4ᶜ (see Fig. 5). On the other sides of the guide members 24 and 25 are a lever 39 which is pivoted on the rod 37, and a lever 40, which is pivoted on the rod 37. The outer ends of the inside levers 33 and 39 are connected by a cross pin 41 to which is pivotally attached a tension rod 42. The ends of the outside levers 36 and 40 are connected by means of the links 36ᵃ and 40ᵃ, respectively, to a cross bar 43, having an adjustable pivotal connection with a tension rod 44, (see Fig. 3). The inside shoes 29ᵃ and 30ᵃ are adapted to bear upon the upper sides of the respective levers 33 and 39, while the outer shoes 31ᵃ and 32ᵃ are arranged to bear upon the upper sides of the outside levers 36 and 40, respectively.

In Fig. 17, I have shown a perspective view of the pressure head which corresponds to the plunger head of the press of the ordinary type in that it compresses the cotton within the box. This head consists of a bottom block 45 which is slotted at 46 to receive the cotton ties, the end pieces 47 and 48, and the central bar 49. The latter member is shaped to fit snugly in openings in the ends 47 and 48, and is provided with enlarged portions 50 and 51 adapted to receive the U-shaped strips 52 and 53. The strip 52 carries at its ends the hooks 52ᵃ and 52ᵇ (see Figs. 3 and 17) while the strip 53 is provided with similar hooks 53ᵃ and 53ᵇ. Across the top, between the end pieces 47 and 48 is secured a rod 54 provided with a curved portion 55 arranged for the reception of the hook and having at its ends rollers 56 and 57, respectively, the purpose of which will be explained hereinafter.

The ends of the tension rods 42 and 44 are provided with eyes arranged to slide over the ends of the bar 49, in the manner clearly shown in the drawings. The ends of the tension rods 29, 30, 31 and 32 are provided with eyes adapted to engage the hooks 52ᵃ, 52ᵇ and 53ᵃ, 53ᵇ, respectively.

The doors of the press are shown most clearly in Fig. 12. Each door comprises an upper member 58 and a lower member 59 having extended lower portions 60 adapted to be journaled on the rod 61 at each side of the device, (see Fig. 1). The upper and lower members 58 and 59 are connected by three strips 62, 63, and 64, respectively. To the members 62 and 64 are secured the back pieces 65 and 66, respectively, which terminate short of the central strip 63 to provide the slots 67 and 68. These slots are enlarged toward their upper ends to accommodate the eyes of the rods 29 and 31, as will be hereinafter explained. The side members 62 and 64 are provided with the U-shaped hooks 69 and 70, whose purpose will be explained hereinafter.

Secured to the upper member 58 is a bar 71 upon whose ends is pivotally mounted a U-shaped rod 72, whose ends terminate in hooks 73 for the purpose of locking the door on both sides. Journaled in suitable bearings on the members 62 and 63 is a rod 74, provided with a hook 75 on one end, and a crank handle 76 on the other. The bottom member 59 also bears similar locking members in the rods 77 and 78, whose ends are provided with hooks 79 and 80, which may be turned down or up to engage the tension rods 29 and 31, respectively. These locking rods may be held in their locking position by means of the small loop 81. The doors on the opposite sides are similar in construction with a few exceptions, which will be set forth. It will be noted that the cross member 7 on each end of the device, (see Figs. 1 and 3) is provided with a slotted bar 82, which rests on an upright 83 secured to the member 7 at its central portion. One end of each of these rods is provided with an eye, through which the hook 73 on the end of the rod 72 is arranged to project, (see Figs. 1 and 3). The opposite ends of the rods 82 are provided with eyes arranged to slip over the ends 84 between strips which are similar to the member 71 on the top of the gate (see Fig. 12). The rods 82 are secured to the ends 84 by means of the cotter pins 85, and which may be removed to loosen the rods and to permit the gates to swing downwardly into the dotted line position shown in Fig. 3.

The top part of the box above the doors is provided with slots 67ª and 68ª on either side thereof, which are continuations of the slots 67 and 68, respectively. On each end of the top bar of the box are the U-shaped bands 8, already referred to (see Fig. 8). The ends of the upper portion of the box are formed by the four plates 86, 87, 88 and 89 which are bolted to the frame members 4ª and 4ᵈ, 4ᵇ and 4ᶜ, respectively. There is a slot 90 between the members 86 and 87, and a similar slot 91 between the members 88 and 89 for the reception of the ends of the member 49. Figs. 2 and 3 will show that the slots 90 and 91 are prolonged into the sides 92 and 93, respectively. These sides are removable, as will be explained later.

Secured to one of the uprights, as 4ª, is a standard 94 which is provided at its top with a threaded T, 95 bearing the arms 96 and 97. On the arm 97 is a pulley 98 and the arm 96 bears a similar pulley 99. A weight 100 is secured by a cable 101 which passes over the pulleys 99 and 98, and fastens to a hook 102 which may engage the links 103, secured to the grooved portion 55 of the bar 54, (as clearly shown in Fig. 1.) A lock nut 104 locks the arms 97 and 96 in any position in which they may be rotated, about the standard 94. The weight, it will be noted, is below the floor 105, and may be received on an abutting surface 106, when slightly lowered.

At 107 I have shown a platform with a railing 108 and steps 109 leading to the platform. This is for the convenience of the workman who stands on the platform during a part of the operation of the device.

From the foregoing description of the various parts of the device, the operation thereof may be readily understood. The end of the chute 110 is shown extending over the box. It will be noted that the end of the chute is elevated only enough to give play to the head, which I will designate in general by H. We will assume that the head is in the position shown in the Fig. 1 and that in order to permit it to swing to one side, the operator engages the end link of the set 103 in order to give the cable 101 sufficient slack to permit the head to assume this position, (the weight 100 resting on the base 106—see Fig. 1). The cotton is going down the chute. The operator who stands on the platform 107 now raises the gate 111, and rakes forward enough cotton to fill the box to the top, after which he closes the gate 111 and then grasps the rollers 56 and 57, swinging the head H forward until the extended ends 49 register with the slots 91 and 90. The lever 13, which during this time has been in its central position, being preferably held there by means of a hook 112 on the member 8, (see Fig. 1) is now shifted so as to cause the rotation of the pulley 17, and hence the turning of the power screw in the manner already described. The rotation of the power screw 22 causes the cross head 23 to descend. The shoes 29ª, 30ª, 31ª and 32ª which are connected with the cross head, are brought down upon their respective levers 33, 39, 36 and 40, the ends of which are connected with the ends of the member 49 by means of the tension rods 42 and 44 as heretofore described. This causes the head H to descend and compress the cotton. I desire to call particular attention to the fact that the downward movement of the cross head, owing to the peculiar arrangement of the levers, effects a faster movement of the head H, thereby decreasing the time in both the downward and upward strokes. When the head has descended to the proper distance for compressing the first charge, the operator reverses the lever, thereby reversing the movement of the power screw 22 and causing the cross head 23 to rise. The hook 102 was caught directly in the lowermost link of the set 103 at the beginning of the downward movement of the head H, so that the weight 100 causes the upward movement of the head H during the reversal of the movement of the power screw. The head H is run up to the top, again, the power is shut off, the weight 100 is again slacked off and the operator pushes the head into the position shown in Fig. 2. He rakes in another charge and the operation is repeated until sufficient cotton has been put into the box to comprise the bale.

The operation of changing the device from a tamper to a baler is as follows: The head H is run down until the eyes of the rods 29, 30, 31 and 32 are opposite the enlarged portions of the slots 67 and 68 in the doors. The rods 29, 30, 31 and 32, which, up to this time, have been held in the dotted line position shown in Fig. 9 clear of the cotton bale by means of the locking device 77 and 78, are now swung to the full line position shown in Fig. 9, in which position they may be locked, after their respective ends have been engaged over the hooks $52^a$, $52^b$ and $53^a$, $53^b$. The pins $49^a$ at the ends of the member 49 are now removed and the tension rods 42 and 44 are slipped off the ends, and allowed to lie loosely against the U-shaped braces 8. It will now be seen that the tension is communicated directly from the cross-head 23 to the head H by means of the tension rods 29, 30, 31 and 32. The lever 13 is again manipulated so as to cause the travel of the cross-head 23 downward, thus exerting the full strength of the press in the final baling operation. The operator now descends to the floor 105 and turns the crank-handle 76, so as to raise the hook 75 (see Fig. 1,) thereby permitting the rod 72 to be swung upwardly, so as to release the hook 73 from the eyes of the rods 82. The door toward the operator now may be pulled outwardly by the rod 72 into the dotted line position shown in Fig. 3. The sides 92 and 93, which were held in place by the members 69, and 70 on the door, (see Figs. 1 and 9) are now pulled outwardly and laid aside. The bale is then tied in the usual manner, after which the machine is reversed a short distance so as to relieve the tension on the rods 29, 30, 31 and 32, which are removed from the hooks and allowed to swing toward the side, (as shown in Fig. 19). The operator now passes around to the door on the other side, removes the pins 85, (see Fig. 3), slips the rods 82 off from the ends of the rods 84 and swings down the door to the dotted line position shown in Fig. 3. The bale may now be pushed out, on either side, and it will be observed that the removal of the bale takes place from the position in which it was finished, and that it does not have to be forced back upwardly through the press in the ordinary manner to the detriment of the cotton fiber. After the removal of the bale, the tension rods 29, 30, 31 and 32 may be placed in the position shown in Fig. 1, and locked by means of the locking members 77 and 78. The tension rods 42 and 44 may be again fastened to the member 49. The sides are again inserted, the doors swung up and fastened to the rod 82, and the apparatus reversed so as to run the head H to the top to repeat the operation.

From the foregoing description, it will be seen that I have provided a device in which the cotton is baled by tension and not compression on the rods. This results in the even distribution of the strain. The enabling of the speed of the head to be changed, I consider of great importance, since the speed is provided when it is most needed, and the power when it is needed. It will be noted that the device is self-contained, that there is no necessity of descending to a lower floor beneath the press to force the bale backwardly, but that the bale is delivered in the position in which it is finished.

The use of the members 24 and 25 as additional supports to the bottom of the box as well as guides for the cross head results in a rigid structure with an economy of material and space.

I claim:

1. A combined tamper and baler comprising a main frame having an upper part constituting a baling-box, a stationary bottom for said baling-box, a compression-head slidably disposed within said box arranged to be reciprocated toward and away from said bottom for compressing a charge, driving means for actuating said compression-head, and means for varying the speed of said compression-head relative to said driving means.

2. A combined tamper and baler comprising a main frame having an upper part constituting a baling-box, a stationary bottom for said baling-box, a compression-head slidably disposed within said box arranged to be reciprocated toward and away from said bottom for compressing a charge, driving means for actuating said compression-head, comprising a power screw and a movable cross-head actuated thereby, tension rods adapted to connect said cross-head with said compression-head to cause a uniform movement of said parts and other means adapted to be acted on by said cross-head for causing a relatively greater movement of the compression-head.

3. A combined tamper and baler comprising a main frame having an upper part constituting a baling-box, a stationary bottom for said baling-box, a compression-head slidably disposed within said box arranged to be reciprocated toward and away from said bottom for compressing a charge, driving means for actuating said compression-head, comprising a power screw, a movable cross-head actuated thereby and disposed centrally of the device beneath said bottom, guides for said cross-head, said guides also constituting supports for said bottom, a pair of tension rods secured to said cross-head on each side thereof and adapted to connect with said compression-head, a pair of pivoted levers on each side of said guides, tension rods secured to the ends of said levers and adapted to be connected with said compression-head and shoes secured to said cross-head and arranged to bear on said levers.

4. In a self-contained tamper and baler, a main frame having an upper part constituting a baling-box, a stationary bottom for said baling-box, a power screw disposed beneath said bottom centrally of the frame, a pair of levers pivotally mounted on said frame on either side of said power screw, tension rods secured to the ends of said levers and adapted to be connected with said compression-head, said head being arranged to be moved out of said box to be swung to one side and to be supported by said tension rods while the box is being charged.

5. In a combined tamper and baler comprising a main frame having an upper part constituting a baling-box a stationary bottom for said baling-box, a compression-head slidably disposed within said box arranged to be reciprocated toward and away from said bottom for compressing a charge, driving means for said compression-head comprising a power screw, and a cross-head, tension rods secured to said cross head and adapted to be connected with said compression-head, doors on the opposite sides of said box hinged to said frame at a point on a level with said bottom and arranged to swing downwardly, said tension rods being arranged to be disconnected from said compression-head and to be moved aside to permit the complete bale to be removed through the door opening.

6. In a self-contained tamper and baler, an upright rectangular frame, the upper part of said rectangular frame comprising a baling-box, a stationary bottom for said baling-box each end of the upper part of said baling-box being provided with a vertical slot, removable end pieces on the lower half of the baling-box having slots arranged to register with the first mentioned slots, a compression-head having extended end portions adapted to enter said slots for guiding the head, driving means within the frame beneath the bottom of the box, hinged levers connected with said frame and arranged to be moved by said driving means and tension rods secured at the ends of said levers and adapted to be connected with the extended portions of said compression-head.

7. In a self-contained tamper and baler, a main frame comprising a baling-box at its upper end, power devices below said baling-box, a stationary bottom for said baling-box, a compression head comprising a block grooved on its under side and having laterally projecting hooks at its sides, extension members at the ends, the upper part of said box being slotted to receive said side hooks and said extended end portions, tension rods being connected with said power devices and adapted to be secured to said side hooks, other tension rods adapted to be actuated by said power devices and to be connected with said extended portions when the side tension rods are disconnected and means for locking said side tension rods in their position of disuse.

8. In a self-contained tamper and baler, an upright rectangular frame, the upper part of said frame constituting a baling-box, a stationary bottom for said baling-box, a pair of doors hinged to said frame on a level with said bottom and arranged to swing downwardly each of said doors being provided with vertical slots, power devices located within said frame below said bottom, a reciprocating compression-head slidably disposed within said box, tension rods connected to said power devices and adapted to be secured to said compression-head, said tension rods being arranged to extend through the vertical slots in the side doors, locking means for said side doors comprising a bar secured to the tops of said side doors and having extended end portions, and end bars loosely carried by the frame and adapted to be secured to the extended portions of the bars at the top of the doors whereby the lateral strain in the direction of the doors will be equally taken up by both doors.

9. In a combined tamper and baler, a main frame, the upper part of said main frame constituting a baling-box, a stationary bottom for said baling-box, power devices located within the frame below said bottom, a reciprocating compression-head, means actuated by said power devices for causing the downward movement of said compression-head, said means operating to cause an initial accelerated movement whereby the speed of the compression-head is increased at the beginning of its stroke and a retarded movement with an increase of power at the end of the stroke.

10. In a combined tamper and baler, a rectangular frame comprising a baling-box at its upper end, a stationary bottom for said box, a reciprocating compression-head slidably disposed within said box, a power screw centrally disposed within said frame beneath said bottom, slotted side doors for said frame, and tension rods adapted to connect said power screw with said compression-head and arranged to extend through said slots.

11. In a combined tamper and baler, a rectangular frame comprising a baling box at its upper end, a stationary bottom for said box, a reciprocating compression head slidably disposed within said box, a power screw centrally disposed within said frame beneath said bottom, a movable nut in engagement with said screw, sliding shoes operated by said nut and tension rods arranged to be engaged by said sliding shoes and connected with said compression head for operating the latter.

EDWARD A. WITHERS.

Witnesses:
L. A. STANLEY,
SOLON C. KEMON.